(12) United States Patent
Galbert

(10) Patent No.: US 8,091,249 B2
(45) Date of Patent: Jan. 10, 2012

(54) GALBERT CALIPER

(75) Inventor: Peter Galbert, Jeffersonville, NY (US)

(73) Assignee: Peter Galbert, Jeffersonville, NY (US)

(*) Notice: Subject to any disclaimer, the term of this patent is extended or adjusted under 35 U.S.C. 154(b) by 120 days.

(21) Appl. No.: 12/221,603

(22) Filed: Aug. 5, 2008

(65) Prior Publication Data

US 2009/0229137 A1 Sep. 17, 2009

Related U.S. Application Data

(60) Provisional application No. 60/965,943, filed on Aug. 24, 2007.

(51) Int. Cl.
*G01B 3/38* (2006.01)
(52) U.S. Cl. .......................................... 33/555.3; 33/549
(58) Field of Classification Search .................. 33/555.3, 33/555.1, 555.2, 555, 679.1, 549–551
See application file for complete search history.

(56) References Cited

U.S. PATENT DOCUMENTS

| | | | | |
|---|---|---|---|---|
| 181,809 A * | 9/1876 | Williams | ...................... | 33/555.3 |
| 1,971,628 A * | 8/1934 | Sutterlin | ....................... | 33/555.3 |
| 2,503,871 A * | 4/1950 | Hartl | ............................ | 33/555.3 |
| 3,128,559 A * | 4/1964 | Winter | ............................ | 33/544 |
| 3,135,056 A * | 6/1964 | Sleeter | ............................ | 33/637 |
| 4,112,581 A * | 9/1978 | Hornsby | ......................... | 33/534 |
| 4,132,001 A * | 1/1979 | Petrik | ............................. | 33/700 |
| 4,596,076 A * | 6/1986 | Sigg | ................................ | 33/555 |
| 4,949,469 A * | 8/1990 | Wachtler | ........................ | 33/702 |
| 5,077,908 A * | 1/1992 | Moore | ............................ | 33/550 |
| 6,044,571 A * | 4/2000 | Strait | ............................ | 33/555.1 |
| 6,205,672 B1 * | 3/2001 | Paulsen et al. | .................. | 33/784 |
| 6,272,762 B1 * | 8/2001 | Kinast et al. | .................... | 33/550 |
| 6,543,151 B2 * | 4/2003 | Smola | ........................... | 33/555.1 |
| 7,047,658 B2 * | 5/2006 | Danielli et al. | .............. | 33/555.1 |
| 7,322,121 B1 | 1/2008 | Lupu | | |
| 7,325,324 B2 * | 2/2008 | Dall'Aglio et al. | .......... | 33/555.3 |
| 2005/0050746 A1 * | 3/2005 | Melander | .................... | 33/555.1 |
| 2005/0120575 A1 * | 6/2005 | Molmann | ..................... | 33/679.1 |

* cited by examiner

*Primary Examiner* — Yaritza Guadalupe

(57) ABSTRACT

Devices and methods for measuring the diameter of a circular cross section of an object either stationary or in motion comprising a fixed angle pair of jaws that are symmetrical about a longitudinal axis bisecting the fixed angle of the pair of jaws, wherein the fixed angle of the jaws is known, are described.

35 Claims, 13 Drawing Sheets

GALBERT CALIPER

RELATED APPLICATION

This application claims the benefit of U.S. Provisional Application No. 60/965,943, filed on Aug. 24, 2007. The teachings of the above application are incorporated herein by reference.

BACKGROUND OF THE INVENTION

Fabrication of items of manufacture to specific circumferential dimensions efficiently is essential for maximizing profitability, especially for those produced by hand, for example, woodturnings on a lathe. Currently, mechanical calipers are preset to the desired dimensions and used to check the item during manufacture for achieving final dimensions. Measuring the diameter of a circular cross section of an item, particularly while it is in motion during manufacture without resetting a caliper or using multiple ones would greatly increase efficiency and profitability. Thus, there is a need for calipers and methods to automatically measure circumferential dimensions of items in motion or stationary during manufacture.

SUMMARY OF THE INVENTION

The invention relates to the inventors discovery that the changing diameter of a circular object (in cross section) during manufacture can be determined using a fixed angle pair of jaws that are symmetrical about a longitudinal axis bisecting a known fixed angle of the jaws. The invention further relates to caliper devices and methods that are able to automatically detect changes in the diameter of an object of manufacture without resetting the caliper, when the object tangentially contacts the pair of jaws. Another aspect of the invention relates to a device for measuring the diameter of an object, either stationary or in motion comprising a housing having a fixed angle pair of jaws that are symmetrical about a longitudinal axis bisecting the fixed angle of the pair of jaws, wherein the fixed angle of thejaws is known; a means for measuring the distance between a point on the circumference of said object and the vertex of the angle formed by said fixed jaws, wherein said object contacts said fixed jaws tangentially, and wherein said point lies on the longitudinal axis that bisects the angle formed by said jaws; and a means for indicating the diameter of the object.

Still another aspect of the invention relates to a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a means for measuring the distance of travel of the stylus; and a display for indicating the diameter of the object.

The invention also relates to a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a cable operationally connecting the stylus to a spring-loaded pointer pivotally mounted in the housing, wherein the distance of travel of the stylus results in the movement of the pointer along a scale for indicating the diameter of a circular cross section of an object.

Another aspect of the invention includes a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a sensor mounted in the housing, wherein the sensor measures the distance of travel of the stylus; an electronic processor; and an electronic display for indicating the diameter of a circular cross section of the object.

An additional aspect of the invention is a method for measuring the diameter of a circular cross section of an object, either stationary or in motion comprising the steps of: 1) contacting the object with a fixed angle pair of jaws that are symmetrical about a longitudinal axis bisecting the fixed angle of the pair of jaws, wherein the fixed angle ($\theta$) of the jaws is known, such that said jaws contact said object at two tangential points on said object; 2) measuring the distance (L) between a point on the circumference of the object that lies on the axis that bisects the angle of the fixed jaws and the vertex of the angle formed by the fixed jaws; and 3) determining the diameter of said object using the measured distance in 2) (L) and the known fixed angle ($\theta$), wherein the diameter (D) is determined by the following formula: $D = L / \frac{1}{2}((\sin \theta/2) - 1 - 1)$.

A further aspect of the invention is a method for measuring the diameter of a circular cross section of an object, either stationary or in motion comprising the steps of: 1) contacting the object with a stylus slidably mounted in a housing, wherein the stylus projects outwardly from the housing and bisects an angle formed by a fixed angled pair of jaws that are symmetrical about a longitudinal axis bisecting the fixed angle of the pair of jaws, wherein the fixed angle of the jaws is known; 2) moving the object toward the vertex of the angle formed by the fixed angled pair of jaws, displacing the stylus linearly, until the jaws contact the object at two tangential points on the circumference of said object; 3) converting the linear displacement of the stylus into the diameter of said object; and 4) displaying the diameter of said object visually.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout different views. The drawings are not necessarily to scale, emphasis instead being placed upon illustrating the principles of the invention.

DETAILED DESCRIPTION OF THE INVENTION

Figure 1:
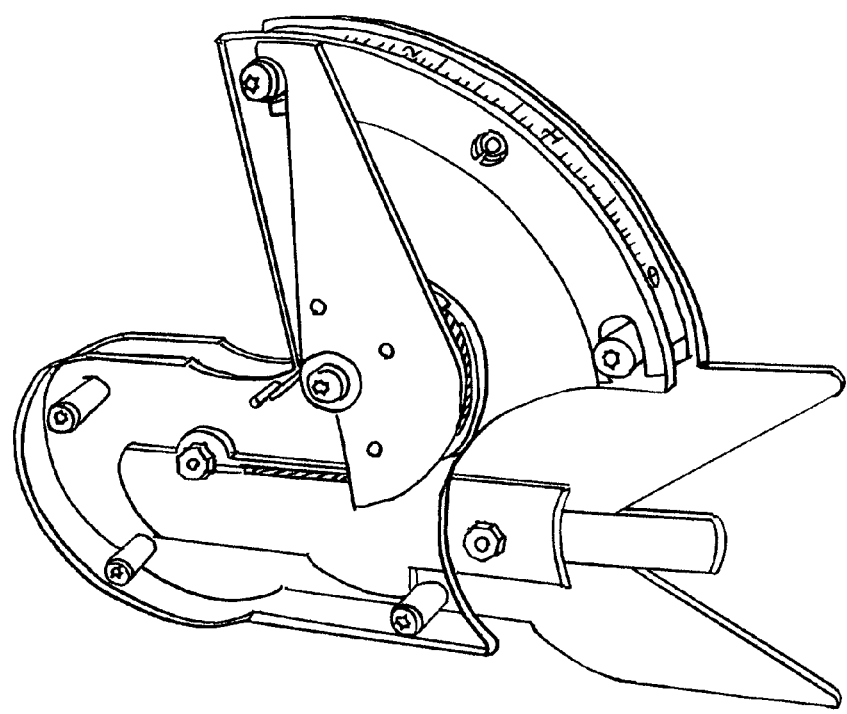
FIG. 1 is a drawing of the Galbert Caliper device.
Figure 2:
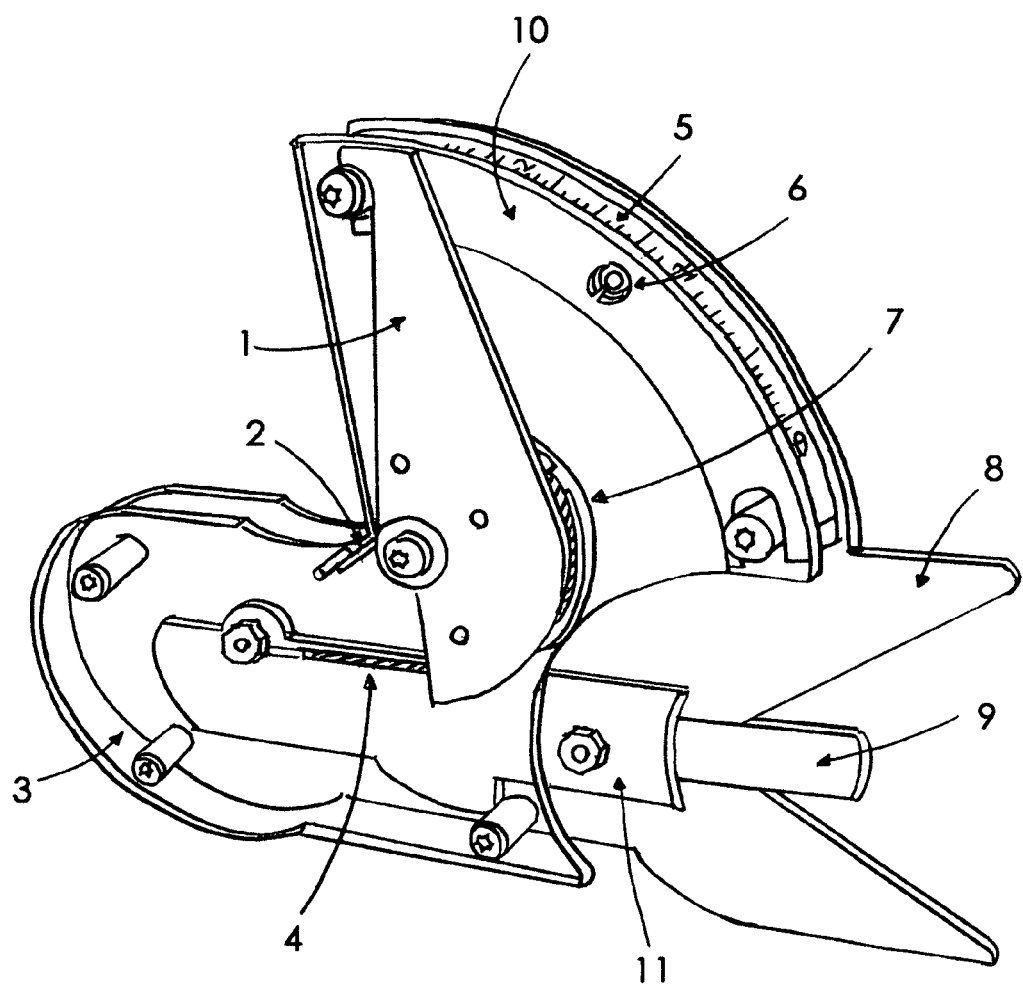
FIG. 2 is a drawing of the front view of the device.
Figure 3:
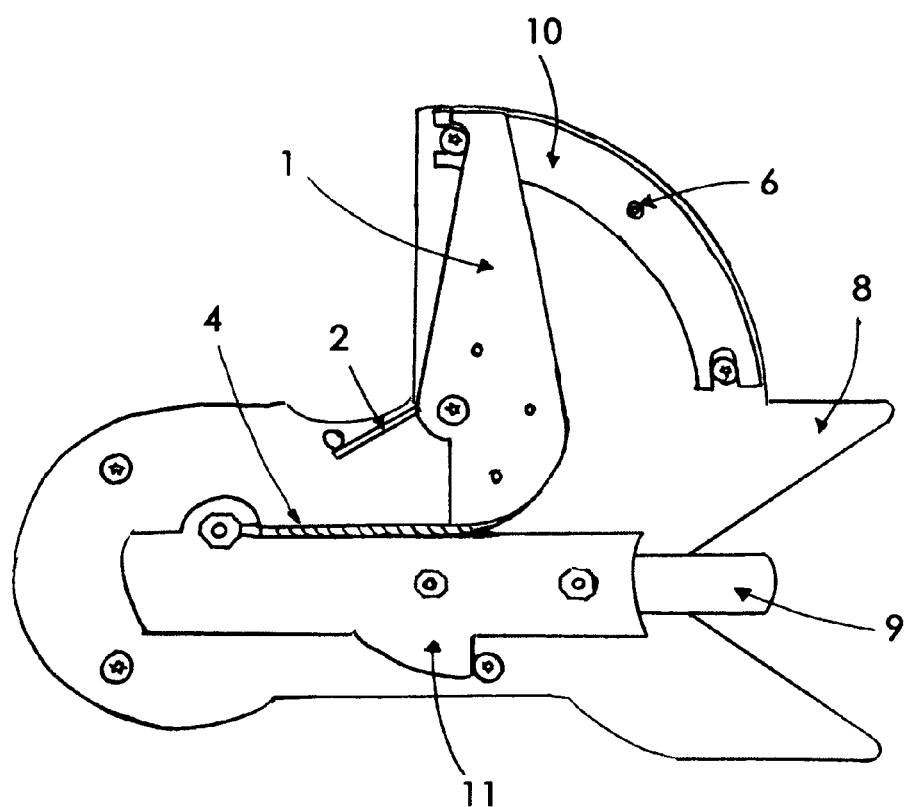
FIG. 3 is a drawing of the front view of the device without the cover plate.

The present invention relates to devices and methods for measuring the diameter of circular objects (in cross section) either stationary or in motion that utilize a fixed angle pair of jaws that are symmetrical about the longitudinal axis bisecting the angle of the jaws, wherein the angle of the jaws is known. The devices and methods of the present invention are useful for automatically measuring the diameter of a stationary circular object or the changing diameter of a circular object in motion during manufacture. The devices and methods of the present invention are particularly useful for automatically measuring the changing diameter of woodturnings on a lathe.

In one embodiment, the present invention is a device for measuring the diameter of a circular object (in cross section) either stationary or in motion comprising a housing having a fixed angle pair of jaws that are symmetrical about a longitudinal axis bisecting the fixed angle of the pair of jaws, wherein the fixed angle of the jaws is known; a means for measuring the distance between a point on the circumference of said object and the vertex of the angle formed by said fixed jaws, wherein said object contacts said fixed jaws tangentially, and wherein said point lies on the longitudinal axis that bisects the angle formed by said jaws; and a means for indicating the diameter of the object.

A fixed angle pair of jaws, as used herein, refers to a pair of jaws whose upper and lower jaws do not move, keeping the angle formed by the upper and lower jaws constant. The fixed angle pair of jaws can be an integral part of the housing or attached to the housing. The jaws can be made of any durable material such as metal, plastic, wood, or composite materials. The choice of material and its thickness can vary depending on the intended application(s) and will be known to one skilled in the art. The fixed angle of the pair of jaws can be any angle less than 180 degrees. One of skill in the art can choose the fixed angle to maximize performance of the caliper for the intended application. As used herein, the term "caliper" can be used interchangeably with the term "device." In a preferred embodiment, the fixed angle of the pair of jaws is 69.7 degrees.

Symmetrical fixed angle jaws are especially useful for measuring the diameter of circular objects (in cross section) either stationary of in motion. One of the innovative features of the present invention is the ability to make one-handed measurements of objects in motion. For example, the present invention can make one-handed measurements of the diameter of woodturnings on a lathe (see FIG. 11). The symmetrical jaws allow one skilled in the art to easily maintain contact with the circular object at two tangential points on the circumference of the object, which is required for accurately measuring the diameter, even if the object is in motion. Another innovative feature of the present invention is the ability to measure changes in the diameter of a circular object during manufacture automatically. Traditional mechanical calipers must be reset to measure changes in the diameter of a circular object. These features greatly enhance the usefulness of the present invention over currently available calipers.

As used herein, "circular cross section of an object" and "circular (in cross section)" can be used interchangeably.

As discussed in the Exemplification section in more detail, the fixed angle of the pair of jaws determines the ratio between the linear travel of the object toward the vertex of the jaws and the decrease in the object's diameter. For example, a fixed angle of 69.7 degrees results in a ratio of 3/8:1. This means that the object will travel 3/8 inch toward the vertex for every one inch decrease in the object's diameter. Therefore, using a known fixed angle and measuring the linear travel of the object toward the vertex will enable one of skill in the art to determine the diameter of the object. The means for measuring the distance between a point on the circumference of the object that lies on the longitudinal axis that bisects the angle formed by the fixed jaws include mechanical, electronic, and both mechanical and electronic.

In a preferred embodiment, the mechanical means for measuring the distance between a point on the circumference of the object that lies on the longitudinal axis that bisects the angle formed by the fixed jaws comprises a stylus slidably mounted in the housing and projecting outwardly bisecting the angle formed by the pair of jaws. The stylus can be made from any durable material such as metal, plastic, wood, or composite materials. The choice of material and its thickness can vary depending on the intended application(s) and will be known to one skilled in the art.

In another embodiment, the electronic means for measuring the distance between a point on the circumference of the object that lies on the longitudinal axis that bisects the angle formed by the fixed jaws is selected from the group consisting of a laser and a sensor strip.

In an alternate embodiment, the mechanical and electronic means for measuring the distance between a point on the circumference of the object that lies on the longitudinal axis that bisects the angle formed by the fixed jaws comprises a stylus slidably mounted in the housing and a sensor strip.

The present invention also encompasses a means for indicating the diameter of a circular cross section of an object visually. Means for indicating the diameter of the object visually include analog and digital displays. The display can be in units suitable for the intended application including SAE and metric.

In one embodiment, the present invention relates to an analog display for indicating the diameter of a circular cross section of an object comprising a cable operationally attaching the stylus to a spring-loaded pointer pivotally mounted in the housing and a scale, wherein the pointer moves along the scale in response to the displacement of the stylus by the object and indicates the diameter of the object on the scale when the jaws contact the object tangentially. A requirement of the present invention is that the pair of jaws contacts the object tangentially at two points on the circumference of the object; one point of contact on each jaw.

In an alternative embodiment, the present invention relates to an electronic display for indicating the diameter of a circular cross section of an object comprising an electronic processor operationally connected to the stylus, sensor strip, and a digital display, wherein the displacement of the stylus along the sensor strip results in a signal sent to the electronic processor which calculates the diameter of the object and displays the diameter on the digital display. As used herein, an "electronic processor" is a "microprocessor." Different configurations are possible and are well within the abilities of one skilled in the art. In another embodiment of the present invention a laser could be substituted for the stylus to measure the distance between a point on the circumference of the object that lies on the longitudinal axis that bisects the angle formed by the fixed jaws and the vertex.

The present invention also relates to a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a means for measuring the distance of travel of the stylus; and a display for indicating the diameter of the object.

In a preferred embodiment, the present invention is a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a cable operationally connecting the stylus to a spring-loaded pointer pivotally mounted in the housing, wherein the distance of travel of the stylus results in the movement of the pointer along a scale for indicating the diameter of a circular cross section of an object.

In another preferred embodiment, the present invention is a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is 69.7 degrees, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a cable operationally connecting the stylus to a spring-loaded pointer pivotally mounted in the housing, wherein the distance of travel of the stylus results in the movement of the pointer along a scale for indicating the diameter of a circular cross section of an object.

In an alternative embodiment, the present invention is a device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a sensor mounted in the housing, wherein the sensor measures the distance of travel of the stylus; an electronic processor; and an electronic display for indicating the diameter of a circular cross section of the object.

The present invention also relates to a method for measuring the diameter of a circular cross section of an object, either stationary or in motion comprising the steps of: 1) contacting the object with a fixed angle pair of jaws that are symmetrical about a longitudinal axis bisecting the fixed angle of the pair of jaws, wherein the fixed angle ($\theta$) of the jaws is known, such that said jaws contact said object at two tangential points on said object; 2) measuring the distance (L) between a point on the circumference of the object that lies on the axis that bisects the angle of the fixed jaws and the vertex of the angle formed by the fixed jaws; and 3) determining the diameter of said object using the measured distance in 2) (L) and the known fixed angle ($\theta$), wherein the diameter (D) is determined by the following formula: $D = L/½((\sin \theta/2)-1-1)$. In a particular embodiment, the fixed angle $\theta$ is 69.7 degrees. The fixed angle $\theta$ of the pair of jaws can be any angle less than 180 degrees. It is well within the abilities of one skilled in the art to choose a fixed angle $\theta$ suitable for the intended application(s).

The present invention further relates to a method for measuring the diameter of a circular cross section of an object, either stationary or in motion comprising the steps of: 1) contacting the object with a stylus slidably mounted in a housing, wherein the stylus projects outwardly from the housing and bisects an angle formed by a fixed angled pair of jaws that are symmetrical about a longitudinal axis bisecting the fixed angle of the pair of jaws, wherein the fixed angle of the jaws is known; 2) moving the object toward the vertex of the angle formed by the fixed angled pair of jaws, displacing the stylus linearly, until the jaws contact the object at two tangential points on the circumference of said object; 3) converting the linear displacement of the stylus into the diameter of said object; and 4) displaying the diameter of said object visually.

Another aspect of the invention is that the displacement of the stylus results in the movement of a pointer along a scale that indicates the diameter of said object, wherein the pointer is pivotally mounted in the housing and operationally connected to the stylus by a cable.

A further aspect of the invention is that the displacement of the stylus is sensed by a sensor and providing a signal to a processor operationally connected to an electronic display for indicating the diameter of said object.

Figure 4:
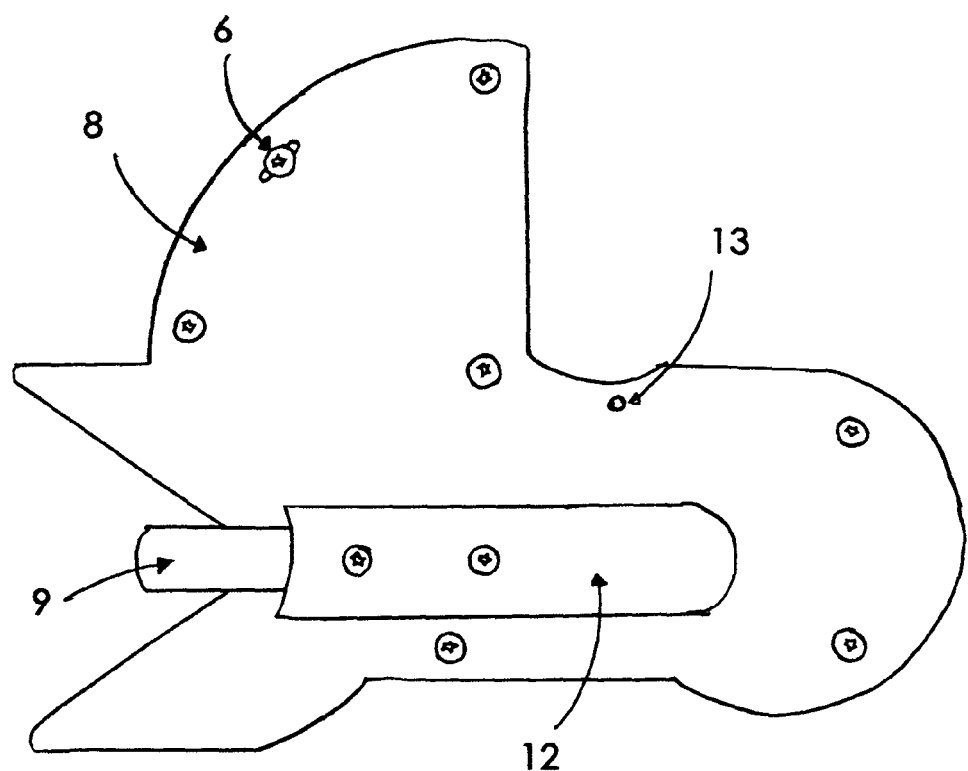
FIG. 4 is a drawing of the rear view of device.
Figure 5:
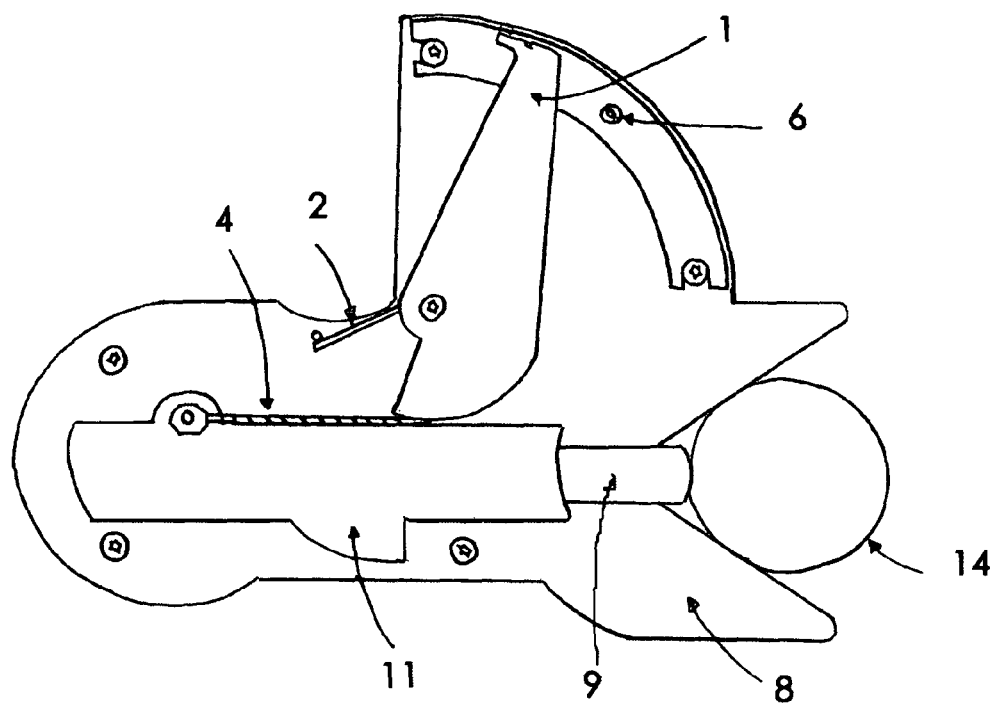
FIG. 5 is a drawing of the front view of the device engaging an object.
Figure 6:
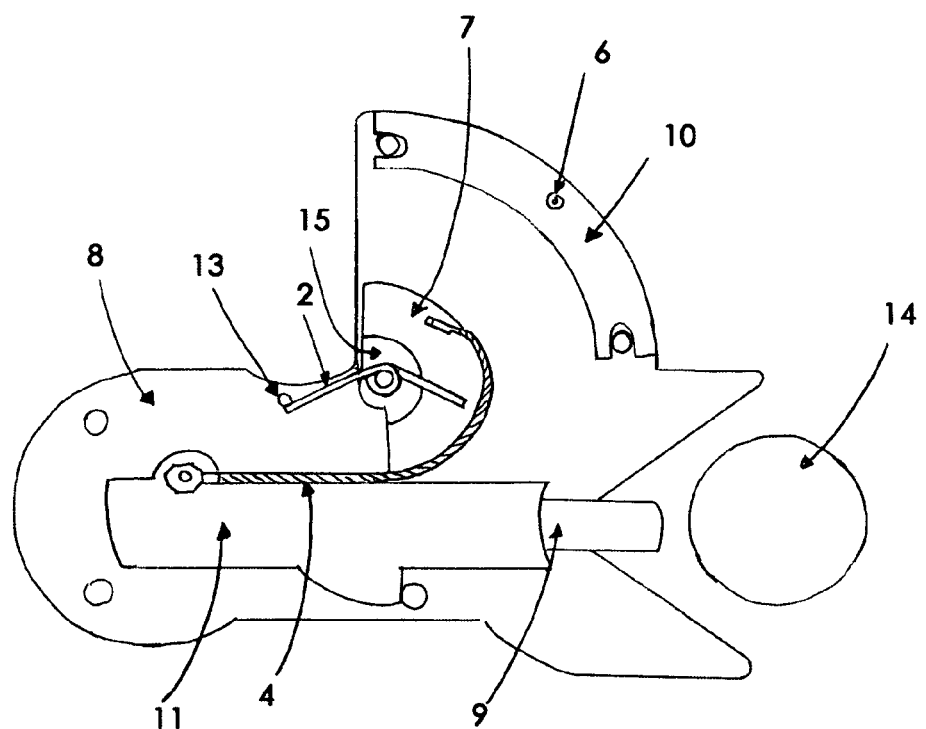
FIG. 6 is a drawing of the front view of the device without the cover plate and the pointer to reveal the cam and spring assembly.
Figure 7:
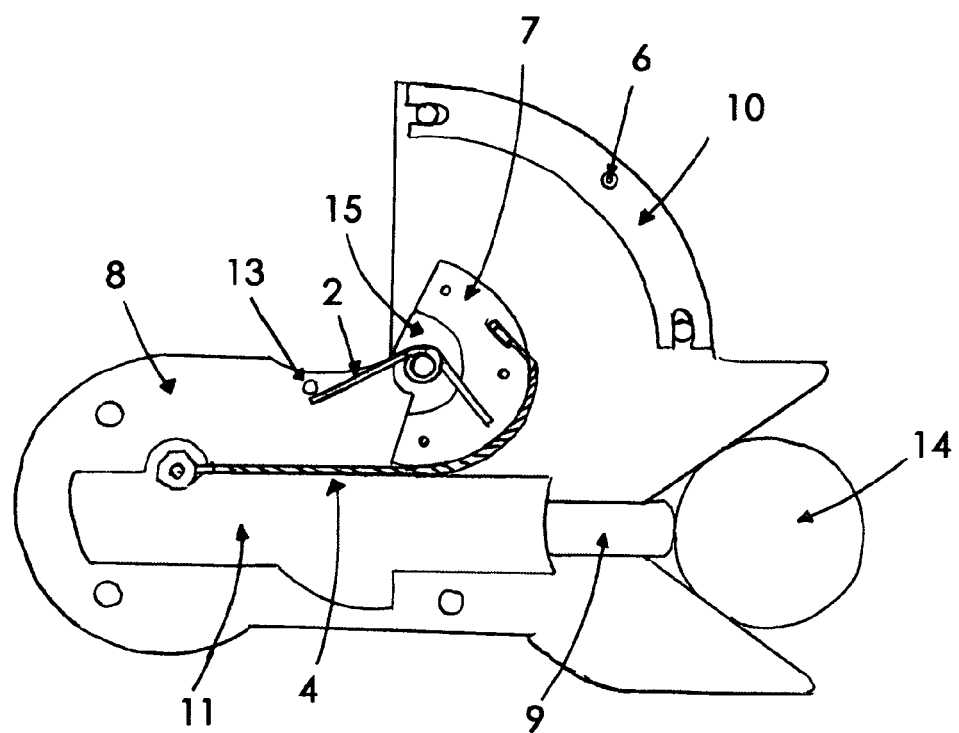
FIG. 7 is a drawing of the front view of the caliper without the cover plate and with the stylus depressed to show the workings of the spring cable and pointer.
Figure 8:
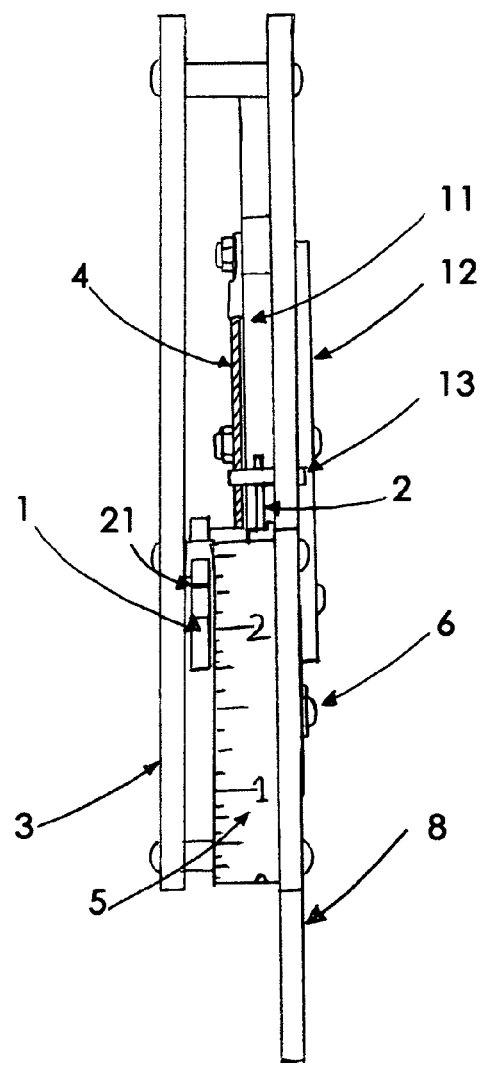
FIG. 8 is a drawing of the top view of the device.
Figure 9:
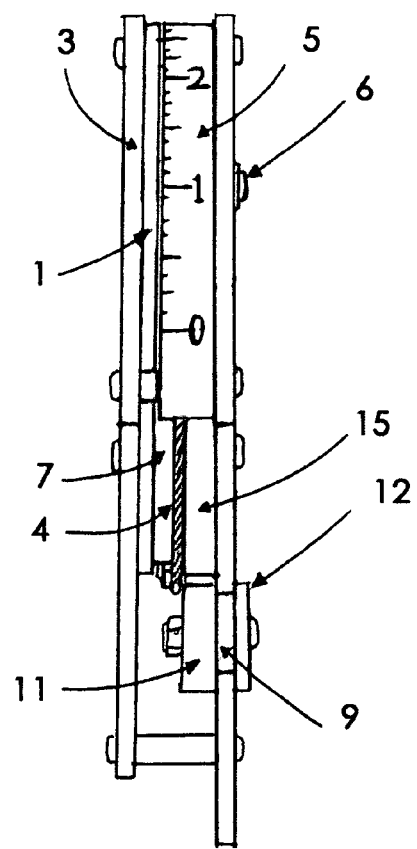
FIG. 9 is a drawing of the side view of the device.
Figure 10:
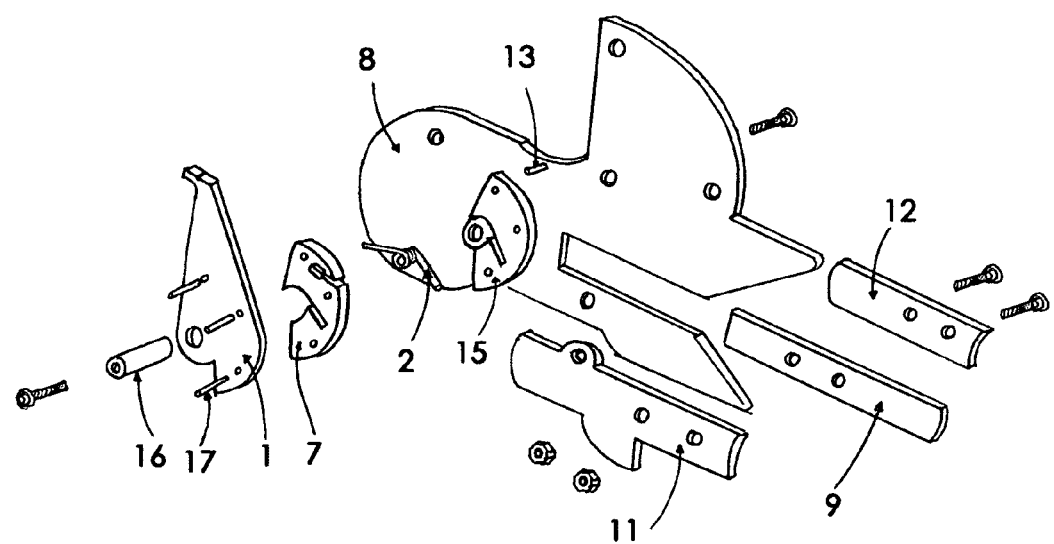
FIG. 10 is a drawing of an exploded view of the cam assembly and the stylus assembly with only the housing shown.
Figure 11:
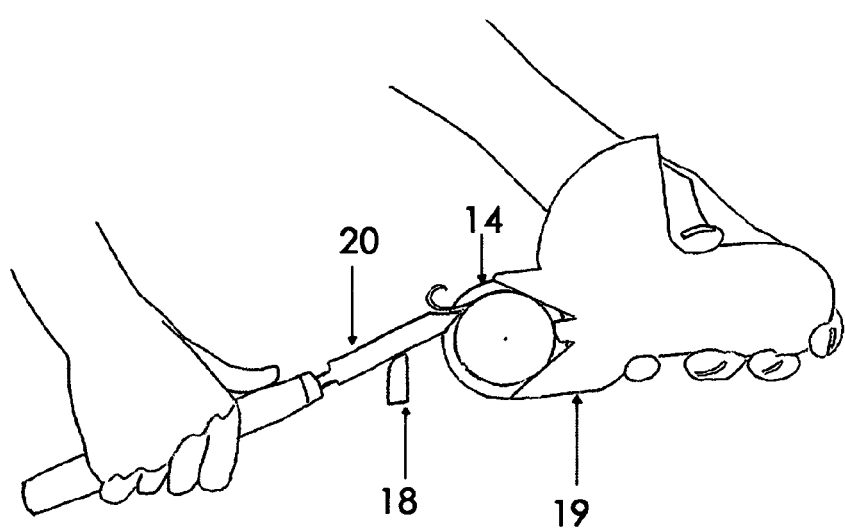
FIG. 11 is a drawing of the device in use by an operator using a woodturning lathe.

The measuring device of the present invention is indicated generally in FIG. 1, shown assembled in FIGS. 2-9, and dissembled in FIG. 10. The different views highlight the components of the present invention and are not intended to be limiting. The device includes as its main components a fixed angle pair of jaws 8, a stylus 9 slidably mounted in the housing, an interior retainer 11, which sets the zero point for the position of the stylus extending outwardly along the axis bisecting the angle formed by the pair of jaws, a pointer 1, a cable 4 operationally connecting the stylus 9 with the pointer via a cam assembly 7, a spring 2 to provide tension to the cable and cam assembly to keep the stylus at the zero point and to maintain tension when taking diameters of circular objects, a printed scale 5 and scale/calibration piece 10 that the pointer moves along to indicate the diameter of the object, and a cover 3. The device contains a calibration screw 6 that allows the scale/calibration piece to be adjusted to calibrate the scale to a known diameter. FIG. 4 shows the exterior retainer 12 and spring retainer pin 13. FIG. 5 shows the device engaging a circular object 14, which displaces the stylus, resulting in the movement of the pointer along the scale indicating the diameter of the object. FIG. 6 shows the caliper without the cover plate and pointer to highlight the cam and spring assembly with the internal cam part 7 visible. FIG. 7 is the same view with the caliper engaging an object 14. FIGS. 8 and 9 are top and front views. FIG. 10 is an exploded view of the cam and stylus assemblies with only the housing shown, which includes internal cam piece 15, cam axle 16, and spring pins 17 for cam assembly. FIG. 11 shows the device in use on a woodturning lathe. Caliper 19 is contacting the object 14 tangentially while a parting tool 20 (resting on the lathe tool rest 18) dimensions the work piece to the desired diameter that will be visible on the device's scale to the operator.

Figure 12:
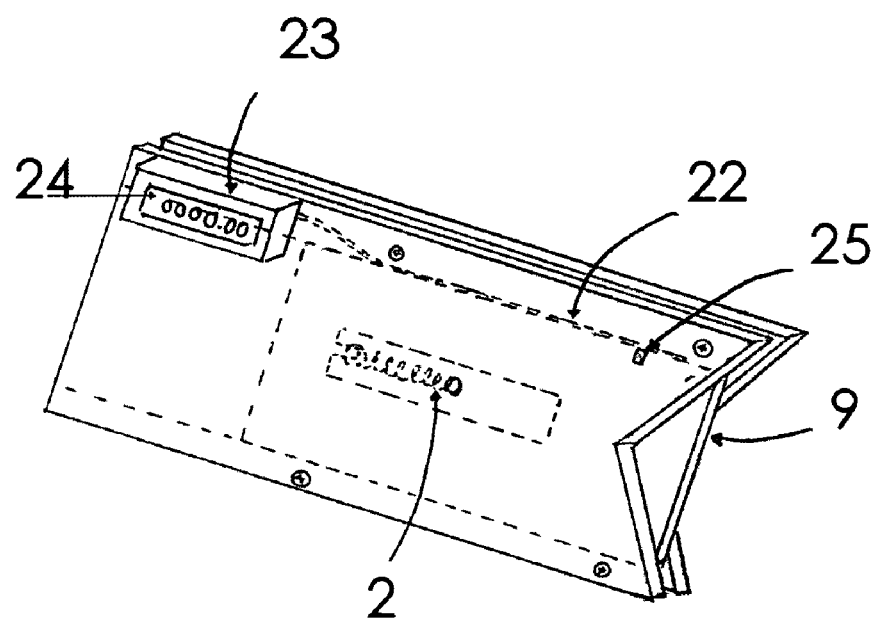
FIG. 12 is a drawing of an electronic version of the device.

FIG. 12 shows an electronic embodiment of the device. The main components of this device include a stylus 9, a spring 2, a sensor strip 22, an electronic processor 23, a digital display 24 and an index point on the stylus 25.

The invention is further described below through examples which are not intended to be limiting.

EXEMPLIFICATION

Example 1

Galbert Caliper Use Guide

This Caliper gives a constant, accurate reading of the diameter of a work piece as it is cut.

It is a "turners tape measure", the operator simply stops cutting when the desired diameter is reached.

The need to set multiple tools and use them in the correct locations is replaced by one tool that needs no setting and is always ready to give accurate readings of the diameter required.

This guide is meant to encourage safe accurate use of the Galbert Caliper and is not a substitute for professional instruction.

Woodturning is a skill and has inherent dangers, before using any woodturning equipment, the operator should be properly trained in the safe practices of woodturning and should use all appropriate safety measures and equipment.

The Galbert Caliper in Use

Range:

The Caliper can measure diameters from 2½" to ½". The Caliper can be used while the cutting tool is engaged from 2½" to ¾".

To measure a diameter ranging from ½" to ¾", the cutting tool should first be removed and then the Caliper can be used to take the measurement.

Do not attempt to cut a diameter smaller than ¾" while the Caliper is in position to take a reading.

Readings on larger diameter pieces can be made with a diminished range. For instance, when measuring grooves cut into a 3" round, the caliper can take readings from 2½" to 1⅞".

Before attempting to measure diameters on pieces larger than 2¾", check to make sure that the tool will measure the smallest diameter intended without the larger diameter contacting the clear cover plate. Contact of the work piece with the clear coverplate may cause damage to the tool and unsafe operation.

Measuring:

Do not attempt to measure a work piece mounted in the running lathe until it has been turned completely round. Check the Galbert Caliper for loose parts and to ensure that all of the moving parts are functioning properly before each use.

To measure the diameter of a round work piece, place the upper jaw against the work piece and press until the stylus and the lower jaw make contact. The dial will move to the point on the scale that corresponds to the diameter. To measure a spinning work piece, cut a small groove with a parting tool and position Caliper on the rear of the piece, opposite the tool rest, so that the stylus rides in the groove and press until both jaws make contact in the groove and read the dial.

Calibration:

To calibrate the Caliper for accurate readings requires a round piece of a known size. Often a portion of the headstock or tailstock will serve well, giving the operator a quick reference to check the calibration of the tool before starting the lathe.

Once the actual size of the round is established, place the Caliper in position to read the diameter. If the reading is not correct, loosen the calibration locking screw that holds the scale in place and move the scale until the dial corresponds to the correct reading. Tighten the locking screw.

Cutting:

The Caliper may be used with a parting tool to take a direct reading of the work piece while it is cut to size. Narrower parting tools (⅛") will work best, as long as the groove cut will allow the Caliper to move freely.

Do not attempt to use the Caliper in a groove that is equal to or narrower than the thickness of the jaw.

Good technique and a properly ground cutting edge will greatly reduce vibration and enable the Caliper to give accurate readings.

Vibration:

Vibration is a common problem in lathe work. There are many causes and remedies. Among the factors are the stability of the lathe, the size of the work piece and most importantly the sharpness of the tool used. Once these factors are addressed, the Caliper can be used without increasing vibration. The key to reducing vibration when starting a new cut is to begin by taking a very light, vibration free cut, BEFORE introducing the Caliper to take a reading. The smooth surface established will help to ensure that further cutting while the Caliper is engaged will remain vibration free.

Copyright Peter Galbert Chairmaker Inc. 2007

Old Taylor Rd. Jeffersonville, N.Y. 12748 (845) 482-9318 www.petergalbertchairmaker.com

Example 2

The Galbert Caliper transforms the linear distance that a round object depresses a stylus, when contacting both sides of an angle which the stylus bisects, to a number that corresponds to its diameter. The degree to which the angle is open will affect the distance that the round object travels toward the vertex, depressing the stylus, before contacting both sides. For practical reasons, a specific rate of linear travel per diameter decrease is desirable and the following formula can be used to determine the angle which will yield this ratio. For example:

The Galbert Caliper in its current incarnation utilizes and angle of 69.70 degrees. This angle allows the round to travel ⅜ths of an inch toward the vertex for every 1 inch that the diameter decreases. The mechanical workings of the caliper reverse this ratio so that every ⅜ths of an inch that the stylus is depressed causes the pointer to move 1 inch. In this way, the caliper displays an accurate measurement of the diameter. To determine the angle for a given ratio between linear movement and diameter decrease, the following formula is used F is the desired ratio, X is the unknown angle required to establish the ratio $$F = \frac{1}{2}\left(\left(\text{SIN}\frac{x}{2}\right)^{-1} - 1\right)$$

TO SOLVE FOR A RATIO OF 3/8:1

(LINEAR TRAVEL:DECREASE IN DIAMETER)

THE FORMULA WORKS AS FOLLOWS $$\frac{3}{8} = \frac{1}{2}\left(\left(\text{SIN}\frac{x}{2}\right)^{-1} - 1\right)$$

$$\left(\text{SIN}\frac{x}{2}\right)^{-1} = \frac{6}{8} + 1$$

$$\left(\text{SIN}\frac{x}{2}\right)^{-1} = 1.75$$

$$\text{SIN}\frac{x}{2} = 0.57143$$

$$\frac{x}{2} = 34.8499$$

$$x = 69.70°$$

Different practical considerations may call for different ratios.

Example 3

Figure 13:
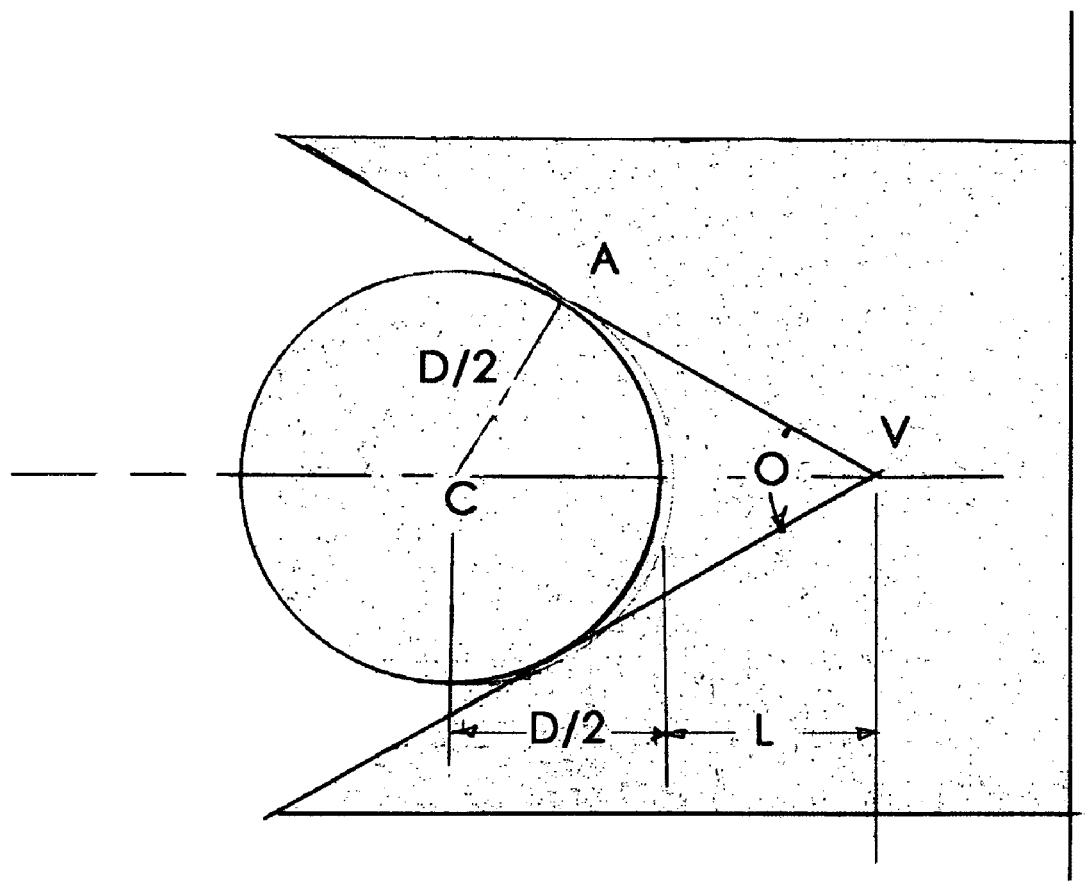

Notes (See FIG. 13)
1. The triangle (VAC) is a right triangle with a vertex "V" and side D/2.
2. Since the point A is a "tangent" point, angle CAV is a Right angle and line AC passes through the Center of the circle.

Noting the triangle (VAC) with hypotenuse length (D/2+L):

$$1.\ \text{Sin}(\theta/2) = \frac{D/2}{D/2 + L}$$

Solving for L:

$$L + D/2((\text{Sin}\ \theta/2)^{-1} - 1) \quad\quad 2$$

To simplify the notation define F:

$$F = \Delta \tfrac{1}{2}((\text{Sin}\ \theta/2)^{-1} - 1) \quad\quad 3$$

Therefore:

$$L = DF \quad\quad 4$$

For any angle $\theta$, F is a constant.

Since F is a constant, the "scale" of the device (for any angle $\theta$) is a constant, i.e. an index point crosses equally spaced markings for equal movements of the "stylus".

Here are tabulations for various values of $\theta$

| $\theta$ | $\theta/2$ | Sin $\theta/2$ | F | L |
|---|---|---|---|---|
| 90 degrees | 45 | 0.07070 | 0.2071 | 0.2071D |
| 60 degrees | 30 | 0.5000 | 0.5 | 0.5D |
| 45 degrees | 22.5 | 0.3827 | .08066 | 0.8066D |
| 38.94 degrees | 19.47 | 0.3333 | 1 | D |

The entry that corresponds to F=1 is of interest because it is the constant where in the decrease in diameter is equal to the linear movement.

To solve for the angle, set F=1 in equation 3:

$$1 = \tfrac{1}{2}((\text{Sin}\ \theta/2)^{-1} - 1)$$

solve for $\theta$ $$(\text{Sin}\ \theta/2)^{-1} = 3$$

$$\text{Sin}\ \theta/2 = 1/$$

$$\theta/2 = 19.47\ \text{degrees}$$

Or $$\theta = 38.94\ \text{degrees}.$$

The current incarnation of the Galbert Caliper uses F=⅜
For F=⅜

$$F = \tfrac{3}{8} = \tfrac{1}{2}((\text{Sin}\ \theta/2)^{-1} - 1)$$

Or $$(\text{Sin}\ \theta/2)^{-1} = \tfrac{6}{8} + 1$$

$$(\text{Sin}\ \theta/2)^{-1} = 1.75$$

$$\text{Sin}\ \theta/2 = 0.57143$$

$$\theta/2 = 34.8499$$

$$\theta = 69.70\ \text{degree}$$

The teaching of all references, patents and patent applications cited are incorporated herein by reference in their entirety. While this invention has been particularly shown and described with references to preferred embodiments thereof, it will be understood by those skilled in the art that various changes in form and details may be made therein without departing from the scope of the invention encompassed by the appended claims.

What is claimed is:

1. A device for measuring the diameter of a circular cross section an object, either stationary or in motion comprising: a housing having a fixed angle pair of jaws that are symmetrical about a longitudinal axis bisecting the fixed angle of the pair of jaws, wherein the fixed angle of the jaws is known; a means for measuring the distance between a point on the circumference of said object and the vertex of the angle formed by said fixed jaws, wherein said object contacts said fixed jaws tangentially, and wherein said point lies on the longitudinal axis that bisects the angle formed by said jaws; and a means for indicating the diameter of the object, and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

2. The device of claim 1, wherein the fixed angle of the pair of jaws is less than 180 degrees.

3. The device of claim 1, wherein the fixed angle of the pair of jaws is about 69.70 degrees.

4. The device of claim 1, wherein the means for measuring the distance between the point on the circumference of the object and the vertex is mechanical, electronic, or both.

5. The device of claim 4, wherein the electronic means for measuring the distance between the point on the circumference of the object and the vertex is selected from the group consisting of sensitive jaws, a sensor strip, and a laser.

6. The device of claim 5, further comprising an electronic processor.

7. The device of claim 6, further comprising an electronic display for indicating the diameter of the object.

8. The device of claim 7, wherein the display is in SAE or metric units.

9. The device of claim 4, wherein the mechanical and electronic means for measuring the distance between the point on the circumference of the object and the vertex comprises a stylus slidably mounted in the housing and projecting outwardly bisecting the angle formed by the pair of jaws, wherein the stylus contacts the point on the object, and a sensor strip, or a laser.

10. The device of claim 9, further comprising an electronic processor and an electronic display.

11. The device of claim 10, wherein the display is in SAE or metric units.

12. The device of claim 1, wherein the means for indicating the diameter of the object is an analog or digital display.

13. The device of claim 1, wherein the pointer is not spring-loaded.

14. The device of claim 1, further comprising a scale for indicating the diameter of the object.

15. The device of claim 14, wherein the scale is SAE or metric.

16. A device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a means for measuring the distance of travel of the stylus; and a display for indicating the diameter of the object and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

17. The device of claim 16, wherein the angle of the pair of jaws is less than 180 degrees.

18. The device of claim 16, wherein the fixed angle of the pair of jaws is about 69.7 degrees.

19. The device of claim 16, wherein the means for measuring distance of travel of the stylus is mechanical, electronic, or both.

20. The device of claim 16, wherein the mechanical means for measuring the distance of travel of the stylus comprises a spring-loaded pointer pivotally mounted to the housing; a cable that is operationally attached to said pointer and said stylus, wherein the distance of travel of the stylus results in the movement of the pointer along a display.

21. The device of claim 16, wherein the pointer is not spring loaded.

22. The device of claim 16, wherein the display comprises a pointer that indicates the diameter of the object on a scale.

23. The device of claim 16, wherein the scale is SAE or metric.

24. A device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a cable operationally connecting the stylus to a spring-loaded pointer pivotally mounted in the housing, wherein the distance of travel of the stylus results in the movement of the pointer along a scale for indicating the diameter of a circular cross section of an object and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

25. The device of claim 24, wherein the fixed angle is less than 180 degrees.

26. The device of claim 24, wherein the fixed angle is about 69.7 degrees.

27. The device of claim 24, wherein the scale is SAE or metric.

28. A device for measuring the diameter of a circular cross section of an object, either stationary or in motion comprising: a housing having a fixed angle pair of jaws that are symmetrical about a longitudinal axis bisecting the fixed angle of the pair of jaws, wherein the fixed angle of the jaws is known, and wherein said object contacts said fixed jaws tangentially; a stylus slidably mounted in the housing and projecting outwardly bisecting the angle formed by the pair of jaws, wherein the stylus contacts the circumference of said object on a point on the axis bisecting the fixed angle; a sensor mounted in the housing, wherein the sensor measures the distance of travel of the stylus; an electronic processor; and an electronic display for indicating the diameter of a circular cross section of the object and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

29. The device of claim 28, wherein the fixed angle is less than 180 degrees.

30. The device of claim 28, wherein the fixed angle is about 69.7 degrees.

31. The device of claim 28, wherein the scale is SAE or metric.

32. A method for measuring the diameter of a circular cross section of an object, either stationary or in motion comprising the steps of: 1) contacting the object with a fixed angle pair of jaws that are symmetrical about a longitudinal axis bisecting the fixed angle of the pair of jaws, wherein the fixed angle ($\theta$) of the jaws is known, such that said jaws contact said object at two tangential points on said object; 2) measuring the distance (L) between a point on the circumference of the object that lies on the axis that bisects the angle of the fixed jaws and the vertex of the angle formed by the fixed jaws; and 3) determining the diameter of said object using the measured distance in 2) (L) and the known fixed angle (θ), wherein the diameter (D) is determined by the following formula:

$$D = L/\tfrac{1}{2}((\sin \theta/2)^{-1} - 1)$$

and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

33. A method for measuring the diameter of a circular cross section of an object, either stationary or in motion comprising the steps of: 1) contacting the object with a stylus slidably mounted in a housing, wherein the stylus projects outwardly from the housing and bisects an angle formed by a fixed angled pair of jaws that are symmetrical about a longitudinal axis bisecting the fixed angle of the pair of jaws, wherein the fixed angle of the jaws is known; 2) moving the object toward the vertex of the angle formed by the fixed angled pair of jaws, displacing the stylus linearly, until the jaws contact the object at two tangential points on the circumference of said object; 3) converting the linear displacement of the stylus into the diameter of said object; and 4) displaying the diameter of said object visually and wherein the mechanical means for measuring the distance between the point on the circumference of the object and the vertex comprises a stylus slidably mounted in the housing and projecting outwardly bisecting the angle formed by the pair of jaws, wherein the stylus contacts the point on the object, further comprising a cable operationally connecting the stylus to a spring-loaded pointer pivotally mounted in the housing.

34. The method of claim 33, wherein the displacement of the stylus results in the movement of a pointer along a scale that indicates the diameter of said object, wherein the pointer is pivotally mounted in the housing and operationally connected to the stylus by a cable.

35. The method of claim 33, wherein the displacement of the stylus is sensed by a sensor and providing a signal to a processor operationally connected to an electronic display for indicating the diameter of said object.

* * * * *